United States Patent
Chen et al.

(10) Patent No.: US 11,082,593 B2
(45) Date of Patent: Aug. 3, 2021

(54) OPTICAL IMAGE SENSING MODULE

(71) Applicant: SONIX Technology Co., Ltd., Hsinchu (TW)

(72) Inventors: Sheng-Jie Chen, Hsinchu County (TW); Chih-Kai Chang, Hsinchu (TW); Yung-Le Chang, Hsinchu County (TW)

(73) Assignee: SONIX Technology Co., Ltd., Hsinchu (TW)

( * ) Notice: Subject to any disclaimer, the term of this patent is extended or adjusted under 35 U.S.C. 154(b) by 162 days.

(21) Appl. No.: 16/443,890

(22) Filed: Jun. 18, 2019

(65) Prior Publication Data

US 2020/0021722 A1    Jan. 16, 2020

(30) Foreign Application Priority Data

Jul. 13, 2018  (TW) .................................. 107124301

(51) Int. Cl.

| G06K 7/10 | (2006.01) |
|---|---|
| H04N 5/225 | (2006.01) |
| G02B 27/09 | (2006.01) |
| H04N 5/33 | (2006.01) |
| G02B 6/35 | (2006.01) |
| G06K 7/14 | (2006.01) |

(52) U.S. Cl.
CPC ......... *H04N 5/2254* (2013.01); *G02B 6/3526* (2013.01); *G02B 27/0955* (2013.01); *G02B 27/0977* (2013.01); *G06K 7/10722* (2013.01); *G06K 7/1404* (2013.01); *H04N 5/33* (2013.01)

(58) Field of Classification Search
CPC ...... H04N 5/2254; H04N 5/33; G02B 6/3526; G02B 27/0955; G02B 27/0977; G06K 7/10722; G06K 7/1404
USPC ..................................................... 235/462.42
See application file for complete search history.

(56) References Cited

U.S. PATENT DOCUMENTS

| 7,874,487 | B2 * | 1/2011 | Nunnink ............ G06K 7/10732 |
|---|---|---|---|
| | | | 235/473 |
| 2005/0087601 | A1 * | 4/2005 | Gerst, III ............. G02B 6/0096 |
| | | | 235/455 |
| 2006/0133757 | A1 * | 6/2006 | Nunnink ............ G06K 7/10742 |
| | | | 385/133 |

FOREIGN PATENT DOCUMENTS

| TW | 201133640 | 10/2011 |
|---|---|---|
| TW | 201318588 | 5/2013 |
| TW | 201604968 | 2/2016 |
| TW | 201709350 | 3/2017 |

* cited by examiner

*Primary Examiner* — Daniel A Hess
(74) *Attorney, Agent, or Firm* — JCIPRNET

(57) ABSTRACT

An optical image sensing module includes a base, an optical body, at least one light emitting component, and a sensing unit. The base has a light shielding portion and a bottom portion. The light shielding portion protrudes from the bottom portion. The light shielding portion has a first opening. The bottom portion has a second opening to correspond to the light shielding portion and a third opening adjacent to the second opening. The optical body is located on the base and has a lens portion and a light guiding portion. The lens portion is connected to the light guiding portion, and is adjacent to the first opening. The light emitting component is disposed within the third opening. The sensing unit is disposed in the second opening.

23 Claims, 8 Drawing Sheets

OPTICAL IMAGE SENSING MODULE

CROSS-REFERENCE TO RELATED APPLICATION

This application claims the priority benefit of Taiwan application serial no. 107124301, filed on Jul. 13, 2018. The entirety of the above-mentioned patent application is hereby incorporated by reference herein and made a part of this specification.

BACKGROUND

Field of the Disclosure

The present disclosure relates to an optical module, and particularly to an optical image sensing module.

Description of Related Art

With the advancement of technology, existing books are often integrated with graphics and sounds to stimulate readers' interest in reading books. For example, a CD or an MP3 player that stores a sound file. However, this method requires the user to search for the relevant sound file separately when reading the book, which in turn causes inconvenience in reading.

Therefore, there is an optical point reading device which utilizes an optical identifying technique to read optical identification code on text or graphics when the optical point reading device points at text or graphics on a book; then sounds are generated through a sounding device to improve the effect of learning from reading. However, the existing optical point reading devices are often limited by the configuration of the optical components therein, which makes it difficult to further reduce the structural size.

SUMMARY

The disclosure provides an optical image sensing module with low cost and small-size structure.

An optical image sensing module of the present disclosure includes a base, an optical body, at least one light emitting component, and a sensing unit. The base has a light shielding portion and a bottom portion. The light shielding portion protrudes from the bottom portion, and the light shielding portion has a first opening. The bottom portion has a second opening to correspond to the light shielding portion and a third opening adjacent to the second opening. The optical body is located on the base and has a lens portion and a light guiding portion. The lens portion is connected to the light guiding portion, and the lens portion is recessed relative to the light guiding portion to accommodate the light shielding portion of the base. The lens portion is adjacent to the first opening of the light shielding portion. The light emitting component is disposed within the third opening of the base. The sensing unit is disposed in the second opening of the base.

In an embodiment of the disclosure, a closed accommodating space is formed between the optical body and the bottom portion of the base.

In an embodiment of the disclosure, the light shielding portion has a columnar portion and a tapered end portion, wherein the columnar portion connects the tapered end portion and the bottom portion of the base, and the inner diameter of the tapered end portion faces the lens portion and is gradually reduced, so that the light shielding portion covers the upper side of the sensing unit.

In an embodiment of the disclosure, the first opening is located at one end of the tapered end portion of the light shielding portion facing the lens portion to form an aperture stop.

In an embodiment of the disclosure, the optical body has a light incident end and a light output end, and the light emitting component is located adjacent to the light incident end of the optical body.

In an embodiment of the disclosure, the light emitting component is adapted to provide a light beam, and the light beam enters the optical body through the light incident end of the optical body. Then the light beam is transmitted to an object and is reflected after exiting the optical body from the light output end, and is transmitted to the sensing unit through the lens portion. Moreover, the sensing unit is adapted to sense an identification code on the object through the light beam reflected by the object.

In an embodiment of the disclosure, the lens portion of the optical body has a first optical surface and a second optical surface, the first optical surface and the second optical surface are opposite to each other, and the first optical surface faces the base. The light guiding portion has a light output surface, an outer peripheral surface, a light incident surface and a first inner peripheral surface, wherein the outer peripheral surface connects the light output surface and the light incident surface, and the first inner peripheral surface connects the light incident surface of the light guiding portion and the first optical surface of the lens portion. Moreover, the first inner peripheral surface surrounds the light shielding portion of the base.

In an embodiment of the disclosure, the light guiding portion further has a second inner peripheral surface, and the second inner peripheral surface connects the light output surface of the light guiding portion and the second optical surface of the lens portion.

In an embodiment of the disclosure, the second inner peripheral surface, the light output surface and the second optical surface together form a tapered recess structure.

In an embodiment of the disclosure, the second optical surface is a convex surface, and the second optical surface is protruded toward a direction away from the optical body.

In an embodiment of the disclosure, the outer peripheral surface is a curved surface, and the outer peripheral surface protrudes toward an outer side of the optical body.

In an embodiment of the disclosure, the light emitting component has a light output surface, and the light output surface faces the light incident surface of the light guiding portion.

In an embodiment of the disclosure, the lens portion has an optical axis, and the light guiding portion is axially symmetrical with respect to an optical axis of the lens portion.

In an embodiment of the disclosure, the base is integrally formed.

In an embodiment of the disclosure, the optical body is integrally formed.

In an embodiment of the disclosure, the base has at least one positioning protrusion, and the optical body has at least one positioning groove, and the at least one positioning protrusion protrudes into the at least one positioning groove to fix the relative position of the base and the optical body.

In an embodiment of the disclosure, the optical image sensing module further includes a substrate. The substrate includes a circuit board, and the sensing unit and the light emitting component are disposed on a surface of the substrate and electrically connected to the circuit board.

An optical image sensing module of the present disclosure includes a substrate, an image sensing component, an infrared light source, a light shielding cylinder, a light guiding body, and a lens. The image sensing component is located on a surface of the substrate. The infrared light source is located on the surface of the substrate. The light shielding cylinder has a first opening and a second opening opposite to each other, and is disposed on the surface of the substrate, and the image sensing component is located in the first opening. The light guiding body is located at a side of the light shielding cylinder and has a light incident surface and a light output surface. The lens is adjacent to the second opening of the light shielding cylinder. The infrared light generated by the infrared light source enters the light guiding body from the light incident surface, then exits the light guiding body through the light output surface, and is reflected on a media surface, and then enters the light shielding cylinder through the lens to from an image on the image sensing component.

In an embodiment of the disclosure, the optical image sensing module further includes a spacer disposed on the surface of the substrate and located between the image sensing component and the infrared light source.

In an embodiment of the disclosure, the spacer is integrally formed with the light shielding cylinder.

In an embodiment of the disclosure, the light guiding body and the lens are integrally formed.

In an embodiment of the disclosure, the light guiding body is located at a side of the lens, and the lens and the light guiding body form a recessed portion to accommodate the light shielding cylinder in the recessed portion.

In an embodiment of the disclosure, the first opening is larger than the second opening.

Based on the above, the optical image sensing module of the embodiment of the present disclosure is designed by making the lens portion and the light guiding portion to form a structure of an optical body together, thereby integrating and reducing the number of components in the module, and thus reducing the size of the optical image sensing module. Moreover, since the base and the optical body of the optical image sensing module can be formed by injection molding, cost can be decreased. In addition, the optical image sensing module can isolate the internal optical component from the outside through the arrangement of the lens portion and the light guiding portion, thereby achieving a dustproof function.

In order to make the aforementioned features and advantages of the disclosure more comprehensible, embodiments accompanying figures are described in detail below.

DESCRIPTION OF EMBODIMENTS

Figure 1A:
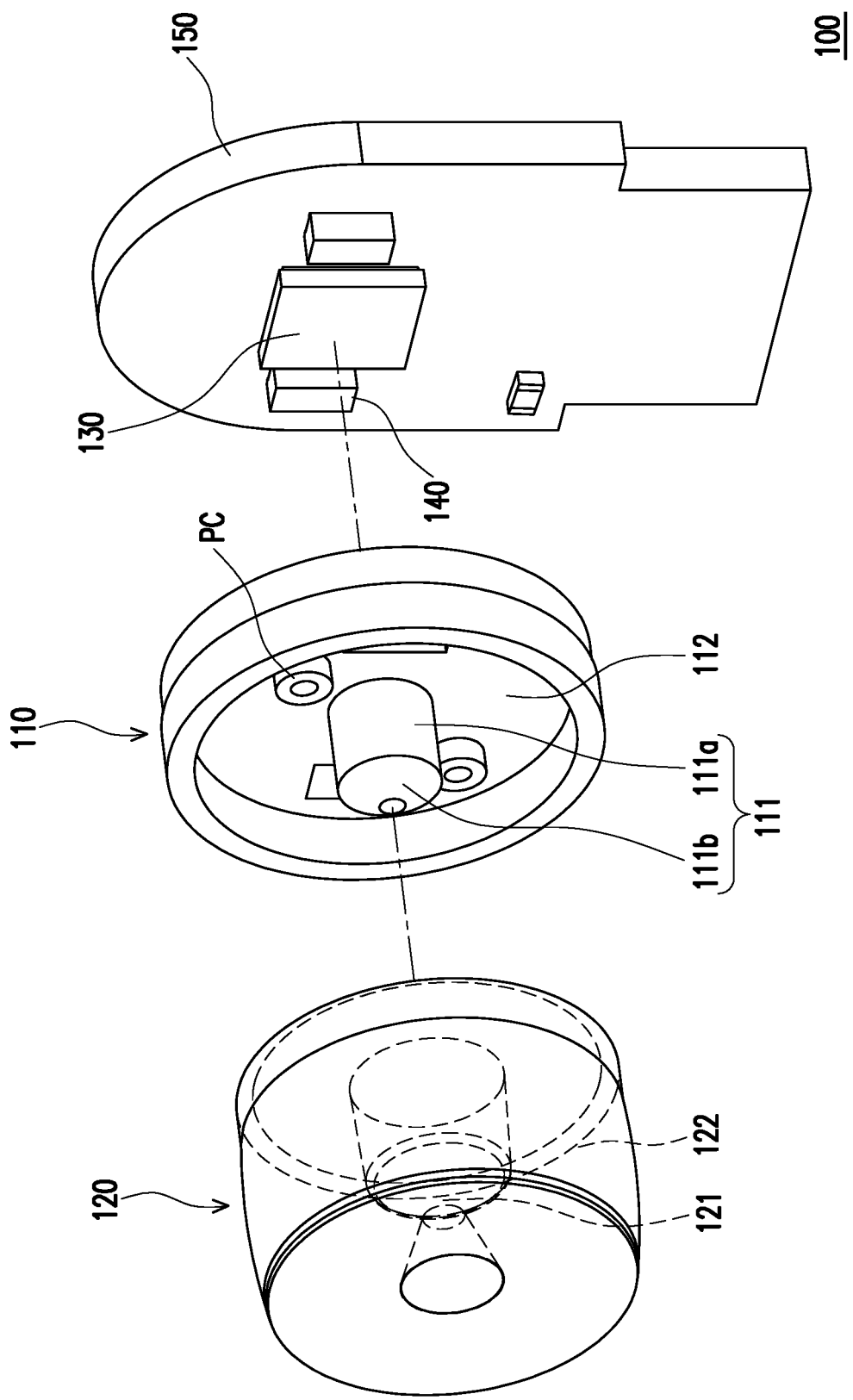
FIG. 1A is an explosive view of an optical image sensing module according to an embodiment of the disclosure.
Figure 1B:
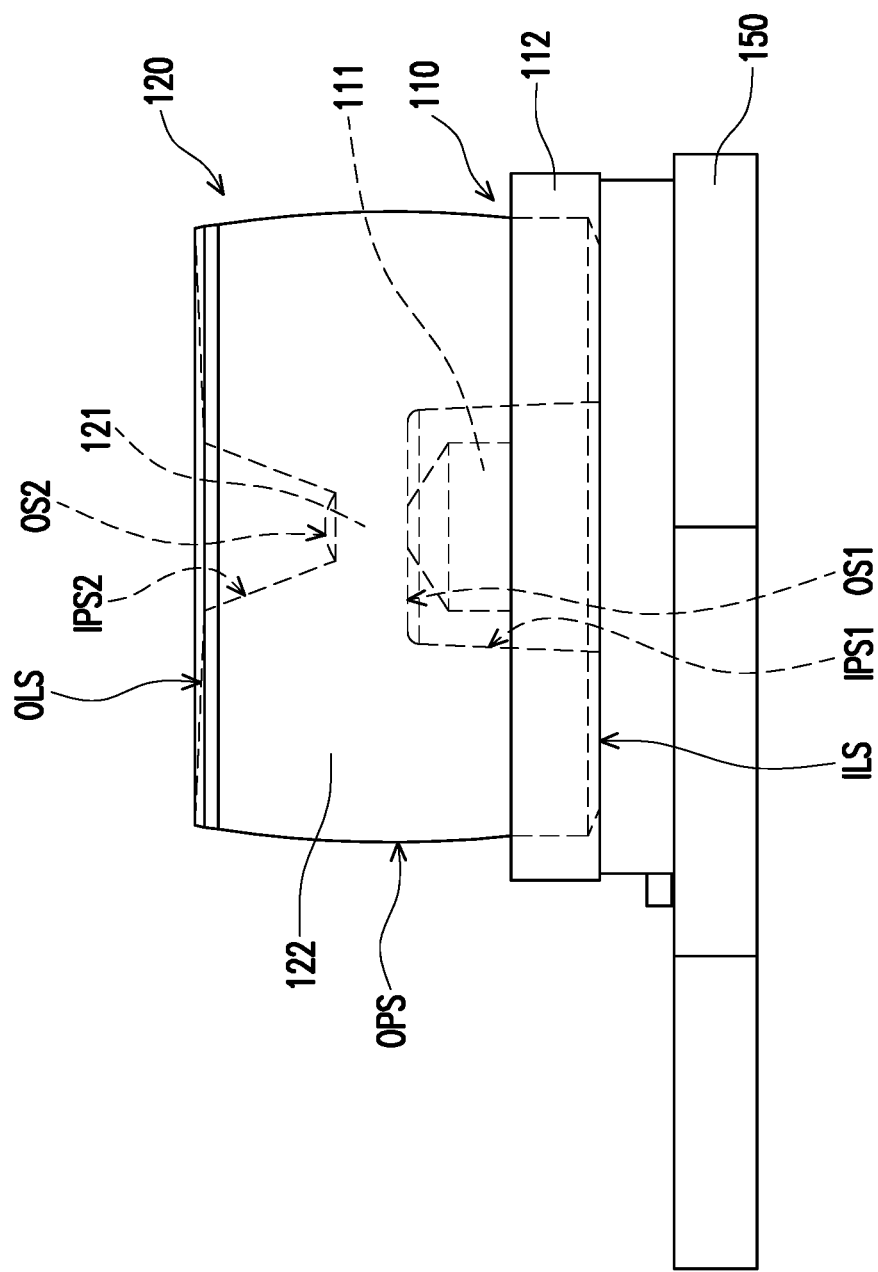
FIG. 1B is a side view of the optical image sensing module of FIG. 1A.
Figure 1C:
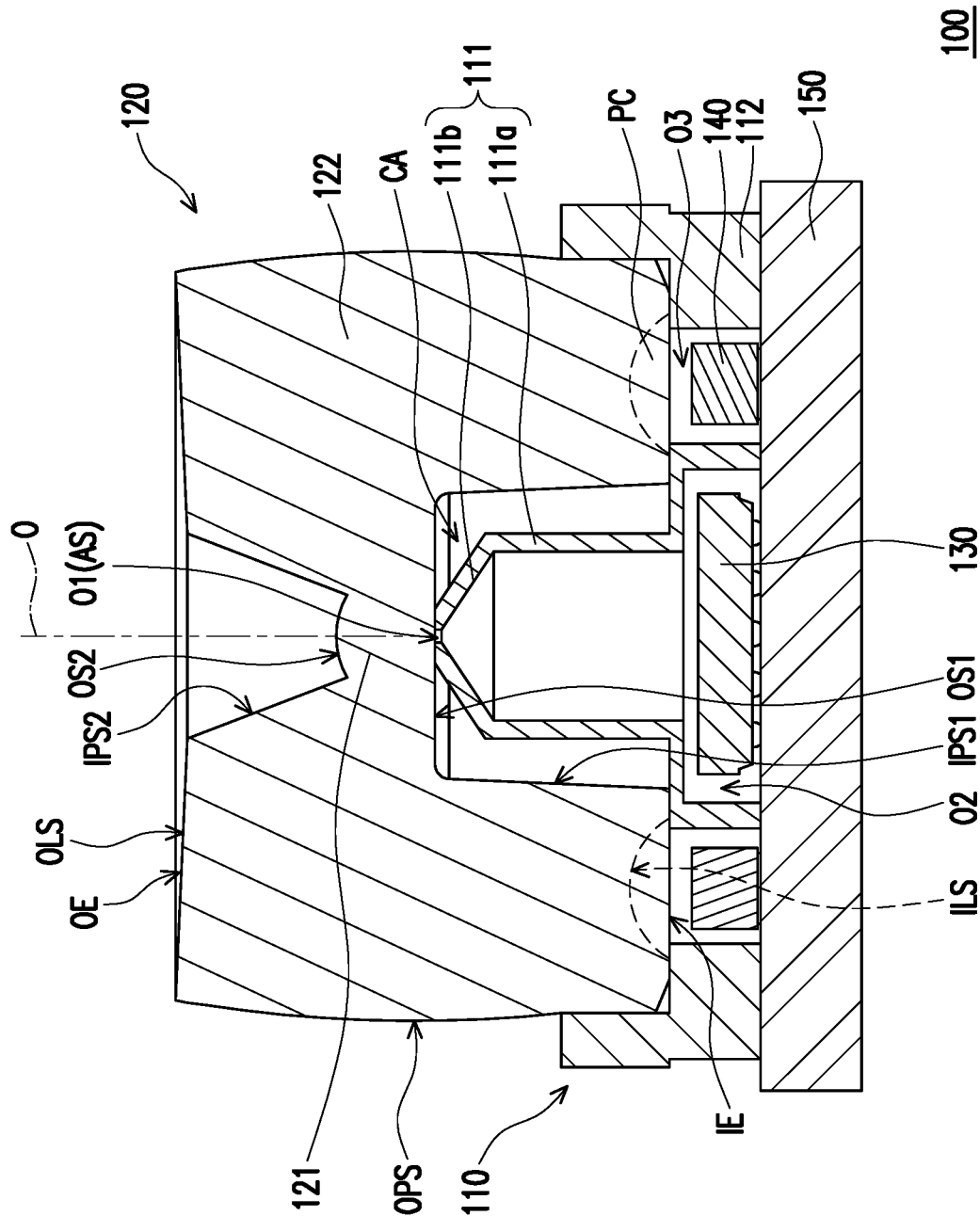
FIG. 1C is a cross-sectional view of the optical image sensing module of FIG. 1A.
Figure 1D:
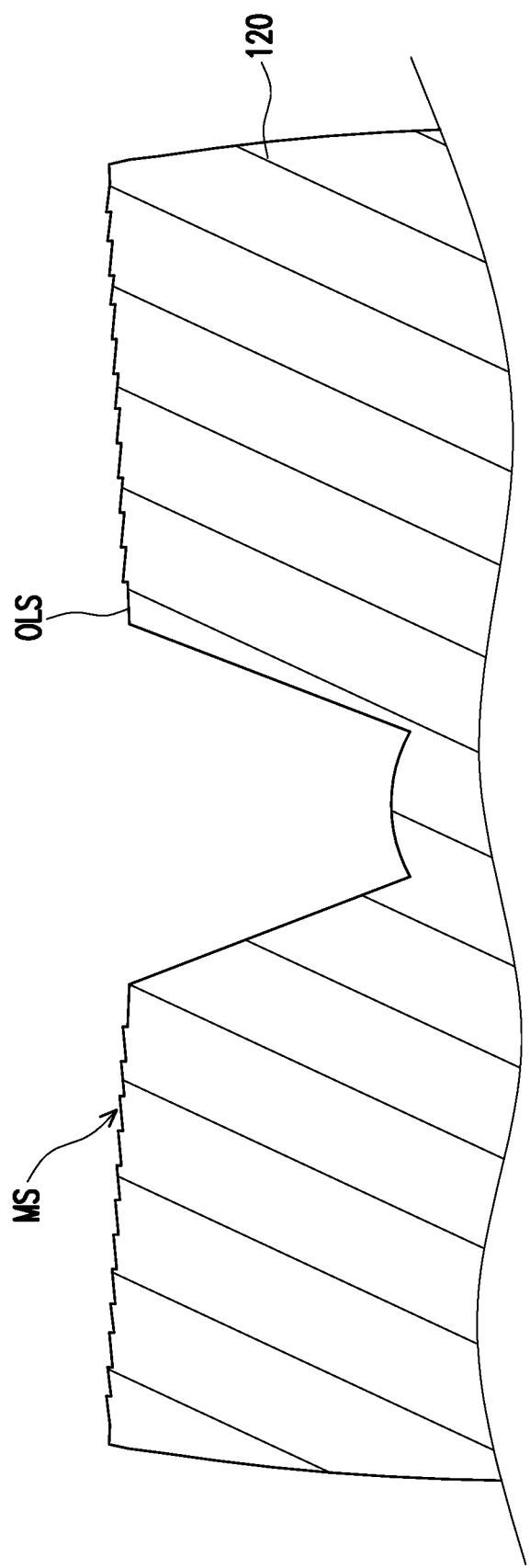
FIG. 1D is a partial enlargement view of a light output surface of the optical body of FIG. 1A.
Figure 1E:
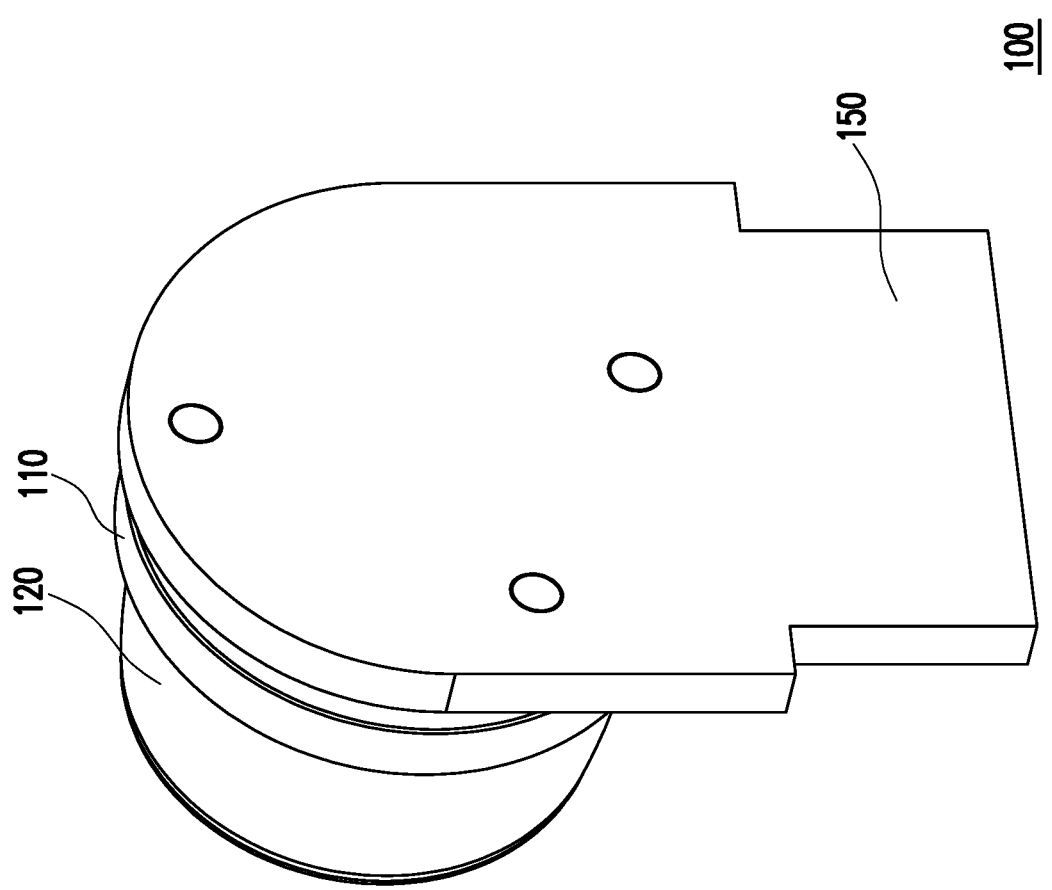
FIG. 1E is a rear view of the optical image sensing module of FIG. 1A.

FIG. 1A is an explosive view of an optical image sensing module according to an embodiment of the disclosure. FIG. 1B is a side view of the optical image sensing module of FIG. 1A. FIG. 1C is a cross-sectional view of the optical image sensing module of FIG. 1A. FIG. 1D is a partial enlargement view of a light output surface of the optical body of FIG. 1A. FIG. 1E is a rear view of the optical image sensing module of FIG. 1A. Referring to FIG. 1A, an optical image sensing module 100 of the present embodiment includes a base 110, an optical body 120, a sensing unit 130, at least one light emitting component 140, and a substrate 150. For example, in this embodiment, the light emitting component 140 can be an infrared light emitting diode, and can provide infrared light. The sensing unit 130 is, for example, a charge coupled device (CCD), a complementary metal-oxide semiconductor (CMOS), or other image sensing components, but the disclosure is not limited thereto. In addition, in the present embodiment, the number of the light emitting component 140 is exemplified as two, but the disclosure is not limited thereto. In other embodiments, the number of the light emitting component 140 may be only one.

Specifically, as shown in FIG. 1A to FIG. 1C, in the embodiment, the base 110 has a light shielding portion 111 and a bottom portion 112. The light shielding portion 111 is located at the center of the base 110 and protrudes from the bottom portion 112. The light shielding portion 111 has a first opening O1. The bottom portion 112 of the base 110 has a second opening O2 to correspond to the light shielding portion 111 and at least one third opening O3 adjacent to the second opening O2. On the other hand, as shown in FIG. 1A to FIG. 1C, in the embodiment, the optical body 120 is located on the base 110 and has a lens portion 121 and a light guiding portion 122. The lens portion 121 is located at the center of the optical body 120 and is connected to the light guiding portion 122. The lens portion 121 is adjacent to the first opening O1 of the light shielding portion 111. Moreover, in the present embodiment, the light emitting component 140 is disposed in the third opening O3 of the base 110, and the sensing unit 130 is disposed in the second opening O2 of the base 110.

More specifically, as shown in FIG. 1C, in the embodiment, the lens portion 121 of the optical body 120 is recessed relative to the light guiding portion 122, and the light guiding portion 122 surrounds the lens portion 121. In this manner, a closed accommodating space is formed between the optical body 120 and the bottom portion 112 of the base 110, thereby accommodating the light shielding portion 111 of the base 110. For example, in the embodiment, both the base 110 and the optical body 120 can be formed by injection molding, and thus the manufacturing cost is low. That is, in the embodiment, the base 110 and the optical body 120 are integrally formed, wherein the base 110 can be a black shading material, and the external stray light can be shielded, and the interior of the optical body 120 is totally reflected and may be a transparent or non-transparent material as long as it can be used to guide light to travel and converge light.

For example, as shown in FIG. 1C, in the embodiment, the optical body 120 has a light incident end IE and a light output end OE, and the light emitting component 140 is located adjacent to the light incident end IE of the optical body 120. The light emitting component 140 is adapted to provide a light beam that enters the optical body 120 through the light incident end IE of the optical body 120, and the light beam exits the optical body 120 from the light output end OE.

Specifically, as shown in FIG. 1B and FIG. 1C, in the present embodiment, the lens portion 121 has an optical axis O, and the light guiding portion 122 is axially symmetrical with respect to the optical axis O of the lens portion 121. More specifically, in this embodiment, on the other hand, the light guiding portion 122 has a light incident surface ILS and a light output surface OLS, wherein the light incident surface ILS is located at the light incident end IE of the optical body 120, and the light output surface OLS is located at the light output end OE of the optical body 120, and a light emitting surface of the light emitting component 140 faces the light incident surface ILS of the light guiding portion 122 so that the light beam can enter the optical body 120 through the light incident surface ILS. For example, in the present embodiment, as shown in FIG. 1C, the light incident surface ILS of the optical body 120 is recessed relative to the edge at the light incident end IE of the optical body 120, thus enhancing the effect of light incidence.

More specifically, as shown in FIG. 1B and FIG. 1C, in the embodiment, the lens portion 121 of the optical body 120 has a first optical surface OS1 and a second optical surface OS2, and the first optical surface OS1 and the second optical surface OS2 are opposite to each other, and the first optical face OS1 faces the base 110. Meanwhile, the light guiding portion 122 further has an outer peripheral surface OPS, a first inner peripheral surface IPS1, and a second inner peripheral surface IPS2. The outer peripheral surface OPS of the light guiding portion 122 connects the light output surface OLS and the light incident surface ILS. The first inner peripheral surface IPS1 connects the light incident surface ILS of the light guiding portion 122 and the first optical surface OS1 of the lens portion 121, and the first inner peripheral surface IPS1 surrounds the light shielding portion 111 of the base 110, and the second inner peripheral surface IPS2 connects the light output surface OLS of the light guiding portion 122 and the second optical surface OS2 of the lens portion 121. Further, as shown in FIG. 1B and FIG. 1C, in the present embodiment, the outer peripheral surface OPS is a curved surface, and the outer peripheral surface OPS protrudes toward the outside of the optical body 120.

Thus, by the structural configuration of the light incident surface ILS, the outer peripheral surface OPS, the first inner peripheral surface IPS1, the second inner peripheral surface IPS2, and the light output surface OLS of the optical body 120, the optical body 120 can make the light beam to enter the optical body 120 through the light incident surface ILS, and then guide the light beam through the outer peripheral surface OPS, the first inner peripheral surface IPS1, and the second inner peripheral surface IPS2 of the light guiding portion 122 to travel inside the optical body 120, and outputted through the light output surface OLS of the light guiding portion 122. On the other hand, as shown in FIG. 1D, the light output surface OLS of the optical body 120 may be provided with a plurality of annular microstructures MS. With the microstructures MS, the light output surface OLS of the optical body 120 can reach the effect of Fresnel lens, so that the light beam that is outputted through the light output surface OLS can be further collimated.

Then, when the light beam exits the light guiding portion 122 of the optical body 120, the light beam is transmitted to an object and then reflected. For example, in this embodiment, the object may be a media surface with identification code information. For example, as shown in FIG. 1B and FIG. 1C, in the embodiment, the second optical surface OS2 of the lens portion 121 is a convex surface, and the second optical surface OS2 is protruded toward a direction away from the optical body 120. Moreover, as required by the structure to be formed, in the present embodiment, the second inner peripheral surface IPS2, the light output surface OLS and the second optical surface OS2 form a tapered recessed structure together. Further, the first opening O1 of the light shielding portion 111 is located at one end of the light shielding portion 111 facing the lens portion 121 to form an aperture stop AS. The aperture stop AS is located between the lens portion 121 and the sensing unit 130 and is located directly below the lens portion 121. In this manner, the reflected light beam can be transmitted to the sensing unit 130 through the lens portion 121 and the aperture stop AS, and the light beam reflected by the object can be focused on the sensing unit 130 through the optical surfaces of the lens portion 121, such that the sensing unit 130 can sense the identification code on the object through the light beam reflected by the object.

In this manner, the optical image sensing module 100 is designed by making the lens portion 121 and the light guiding portion 122 to form a structure of an optical body 120 together, thereby integrating and reducing the number of components in the module, and thus reducing the size of the optical image sensing module 100. Moreover, since the base 110 and the optical body 120 of the optical image sensing module 100 can be formed by injection molding, cost can be decreased. In addition, the optical image sensing module 100 can isolate the internal optical component from the outside through the arrangement of the lens portion 121 and the light guiding portion 122, thereby achieving a dustproof function.

On the other hand, as shown in FIG. 1C, in the present embodiment, the light shielding portion 111 is a hollow structure and has a columnar portion 111*a* and a tapered end portion 111*b,* wherein the columnar portion 111*a* connects the tapered end portion 111*b* and the bottom portion 112 of the base 110, and the inner diameter of the tapered end portion 111*b* is gradually reduced toward the lens portion 121, such that the light shielding portion 111 covers the upper side of the sensing unit 130. In other words, in the present embodiment, the second opening O2 of the light shielding portion 111 is larger than the first opening O1. For example, in the embodiment, the first opening O1 of the light shielding portion 111 is located on the tip end of the tapered end portion 111*b,* but the disclosure is not limited thereto. In this manner, since the light shielding portion 111 covers the sensing unit 130 by the arrangement of the columnar portion 111*a* and the tapered end portion 111*b,* and the bottom portion 112 of the base 110 also surrounds the periphery of the sensing unit 130, the base 100 helps to block the stray light transmitted through the light guiding portion 122.

In addition, in the embodiment, the base 110 and the optical body 120 are also selectively provided with a positioning structure for fixing the relative position of the base 110 and the optical body 120 or the base 110 and the substrate 150. For example, as shown in FIG. 1A and FIG. 1C, the base 110 has at least one positioning protrusion PC, and the optical body 120 has at least one positioning groove PG, wherein the at least one positioning protrusion PC protrudes into at least one positioning groove. (not shown), and can be used to fix the relative position of the base 110 and the optical body 120. On the other hand, as shown in FIG. 1A and FIG. 1C, the substrate 150 has a plurality of positioning holes that can be connected with a positioning structure (not shown) of the base 110 to fix the relative position of the base 110 and the substrate 150.

In addition, as shown in FIG. 1C and FIG. 1E, in the embodiment, the substrate 150 can include a circuit board, and the sensing unit 130 and the light emitting component 140 are disposed on a surface of the substrate 150 and electrically connected to the circuit board. The optical image sensing module 100 can further include a connector (not shown) disposed on the other side of the substrate 150 facing away from the sensing unit 130. The connector can be electrically connected to the circuit board in the substrate 150 and an external terminal, and can be used to transmit the image signal obtained by the sensing unit 130. In this manner, the optical image sensing module 100 can achieve the function of reading the optical identification code on the object.

Figure 2A:
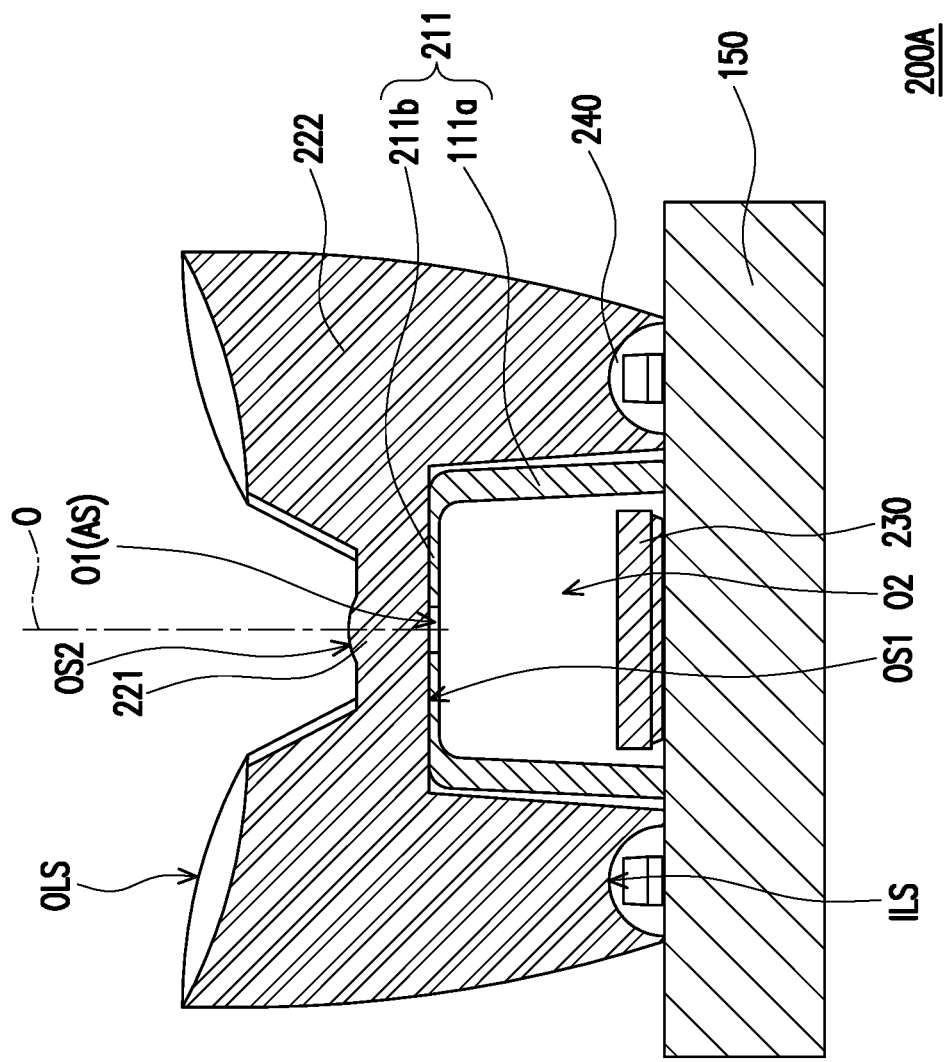
FIG. 2A and FIG. 2B are cross-sectional views of different optical image sensing modules according to an embodiment of the present disclosure.
Figure 2B:
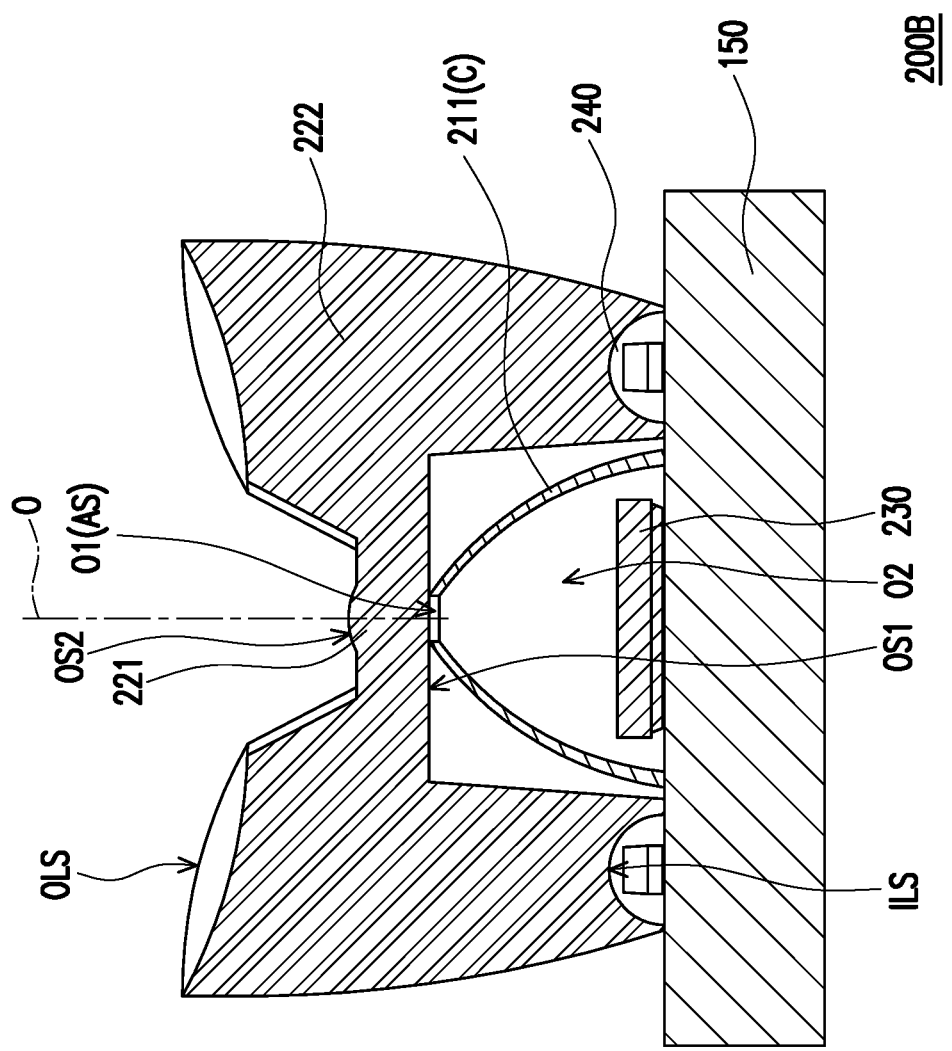

FIG. 2A and FIG. 2B are cross-sectional views of different optical image sensing modules according to an embodiment of the present disclosure. An optical image sensing module 200A and an optical image sensing module 200B of FIG. 2A and FIG. 2B are similar to the optical image sensing module 100 of FIG. 1A to FIG. 1E, and the differences are as follows. As shown in FIG. 2A and FIG. 2B, in the embodiment, the optical image sensing module 200A and the optical image sensing module 200B include a light shielding cylinder 211, a light guiding body 222, a lens 221, an infrared light source 240, an image sensing component 230 and a substrate 150. Specifically, as shown in FIG. 2A and FIG. 2B, in the embodiment of FIG. 2A and FIG. 2B, the infrared light source 240 is the same as the light emitting component 140, and the image sensing component 230 is the same as the sensing unit 130, and related description is not repeated herein. On the other hand, in the embodiment of FIG. 2A and FIG. 2B, the light shielding cylinder 211 is similar to the light shielding portion 111 of the base 110 of FIG. 1A to FIG. 1D, and the light guiding body 222 and the lens 221 are respectively similar to the light guiding portion 122 and the lens portion 121 in FIG. 1A to FIG. 1D, and the difference is as follows.

Specifically, as shown in FIG. 2A and FIG. 2B, in the embodiment of FIG. 2A and FIG. 2B, the light shielding cylinder 211 is disposed on the surface of the substrate 150 and also has a first opening O1 and a second opening O2 opposite to each other, but the first opening O1 of the light shielding cylinder 211 is located at the center of a circular plate portion 211b, and the lens 221 is adjacent to the first opening O1 of the light shielding cylinder 211 to form the aperture stop AS.

Further, the light shielding cylinder 211 is different from the light shielding portion 111 of the embodiment of FIG. 1A to FIG. 1D in that, as shown in FIG. 2A, the light shielding cylinder 211 does not have the tapered end portion 111b but has a circular plate portion 211b. On the other hand, as shown in FIG. 2B, the light shielding cylinder 211 only has one tapered portion C and does not have the columnar portion 111a. However, in the embodiment of FIG. 2A and FIG. 2B, the second opening O2 of the light shielding cylinder 211 is larger than the first opening O1, so that the light shielding cylinder 211 can still cover and surround the image sensing component 230, which helps to block the stray light transmitted through the light guiding body 222.

In addition, in the embodiment of FIG. 2A and FIG. 2B, the light guiding body 222 is located at the side of the light shielding cylinder 211, and in the embodiment of FIG. 2A and FIG. 2B, the light guiding body 222 has two columnar structures respectively disposed on both sides of the light shielding cylinder 211 and connected to the lens 221. In addition, in the embodiment of FIG. 2A and FIG. 2B, the light guiding body 222 and the lens 221 are also integrally formed, and the lens 221 and the light guiding body 222 also form a recessed portion CA, so that the light shielding cylinder 211 can be accommodated in the recessed portion CA.

In this manner, with the above structural configuration, the infrared light generated by the infrared light source 240 enters the light guiding body 222 from the light incident surface ILS of the light guiding body 222, and then exits the light guiding body 222 through the light exit surface OLS and is reflected on the media surface of the object, and enters the light shielding cylinder 211 through the lens 221 to form an image on the image sensing component 230. In this manner, the optical image sensing module 200A and the optical image sensing module 200B can also achieve the function of reading the optical identification code on the object.

With such configuration, in this embodiment, since the optical image sensing module 200A and the optical image sensing module 200B have similar structures as the optical image sensing module 100 in FIG. 1A to FIG. 1E, it is possible to integrate and reduce the number of components in the module through the structure integrally formed by the lens 221 and the light guiding body 222, thereby helping to reduce the size of the optical image sensing module 200A and the optical image sensing module 200B, thus achieving similar function. Therefore, the optical image sensing module 200A and the optical image sensing module 200B can achieve similar effects and advantages as the optical image sensing module 100, and related description will not be repeated herein.

Figure 3:
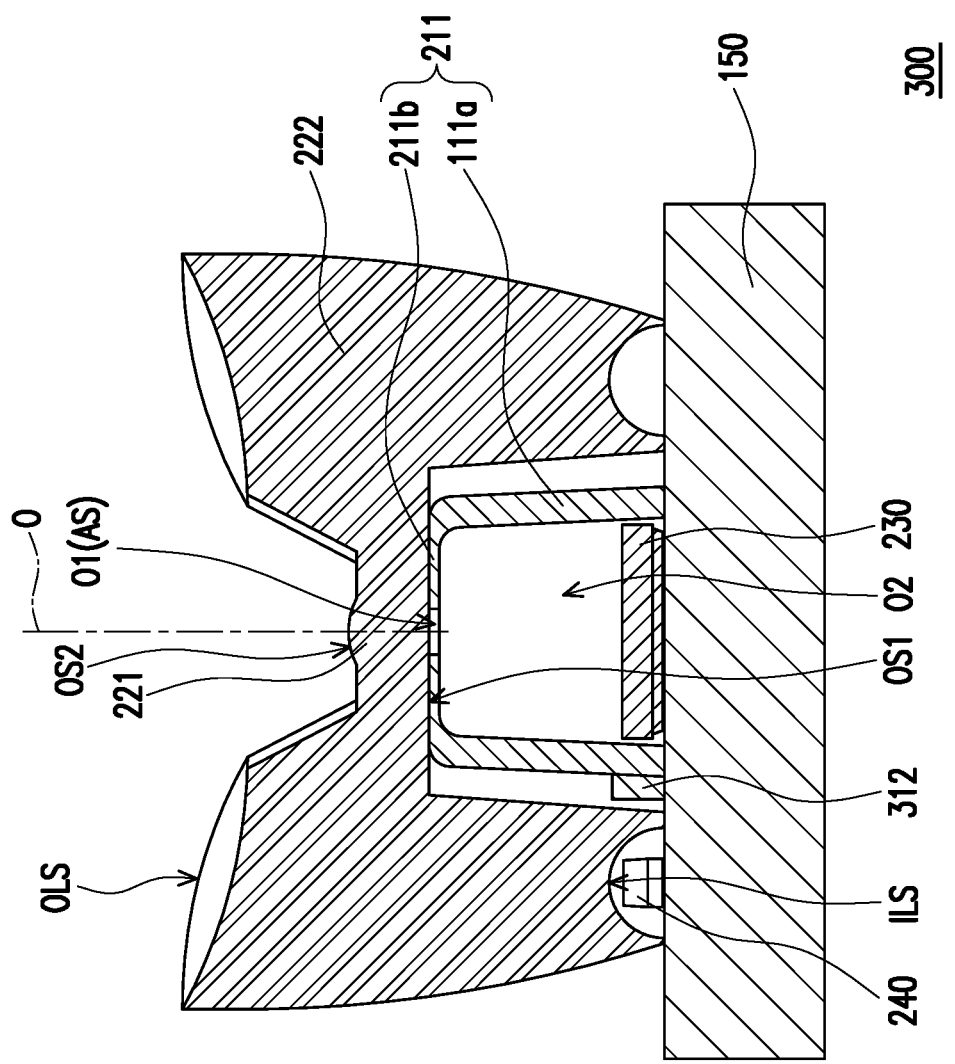
FIG. 3 is a cross-sectional view of still another optical image sensing module according to an embodiment of the disclosure.

FIG. 3 is a cross-sectional view of still another optical image sensing module according to an embodiment of the disclosure. An optical image sensing module 300 of FIG. 3 is similar to the optical image sensing module 200A of FIG. 2A, and the differences are as follows. As shown in FIG. 3, in the embodiment, the optical image sensing module 300 further includes a spacer 312 disposed on the surface of the substrate 150 and located between the image sensing component 230 and the infrared light source 240. Moreover, as shown in FIG. 3, in the present embodiment, the spacer 312 and the light shielding cylinder 211 are integrally formed, but the present disclosure is not limited thereto, and the spacer 312 and the light shielding cylinder 211 may be independent single components. In this manner, the optical image sensing module 300 can also block the stray light transmitted through the light guiding body 222 through the arrangement of the light shielding cylinder 211 and the spacer 312, so that the image sensing component 230 can sense and read the identification code on the object more accurately.

In addition, in the embodiment, since the optical image sensing module 300 has a similar structure as the optical image sensing module 200A and the optical image sensing module 200B of FIG. 2A and FIG. 2B, it is possible to integrate and reduce the number of components in the module through the structure integrally formed by the lens 221 and the light guiding body 222, thereby helping to reduce the size of the optical image sensing module 300, thus achieving similar function. Therefore, the optical image sensing module 300 can achieve similar effects and advantages as the optical image sensing module 200A, and related description will not be repeated herein.

In summary, the optical image sensing module of the embodiment of the present disclosure is designed by making the lens portion and the light guiding portion (or lens and light guiding body) to form an integral structure, thereby integrating and reducing the number of components in the module, and thus reducing the size of the optical image sensing module. Moreover, since the base and the optical body of the optical image sensing module can be formed by injection molding, cost can be decreased. In addition, the optical image sensing module can isolate the internal optical component from the outside through the arrangement of the lens portion and the light guiding portion (or lens and light guiding body), thereby achieving a dustproof function.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. An optical image sensing module, comprising:
  a base, having a light shielding portion and a bottom portion, wherein the light shielding portion protrudes from the bottom portion, and the light shielding portion has a first opening, and the bottom portion has a second opening to correspond to the light shielding portion and a third opening adjacent to the second opening;
  an optical body, disposed on the base and having a lens portion and a light guiding portion, wherein the lens portion is connected to the light guiding portion, and the lens portion is recessed relative to the light guiding portion to accommodate the light shielding portion of the base, and the lens portion is adjacent to the first opening of the light shielding portion;
  at least one light emitting component disposed in the third opening of the base; and
  a sensing unit, disposed in the second opening of the base.

2. The optical image sensing module according to claim 1, wherein a closed accommodating space is formed between the optical body and the bottom portion of the base.

3. The optical image sensing module according to claim 2, wherein the light shielding portion has a columnar portion and a tapered end portion, wherein the columnar portion connects the tapered end portion and the bottom portion of the base, and an inner diameter of the tapered end portion is gradually reduced toward the lens portion such that the light shielding portion covers an upper side of the sensing unit.

4. The optical image sensing module according to claim 2, wherein the first opening is located at an end of the tapered end portion of the light shielding portion facing the lens portion to form an aperture stop.

5. The optical image sensing module according to claim 1, wherein the optical body has a light incident end and a light output end, and the light emitting component is located adjacent to the light incident end of the optical body.

6. The optical image sensing module according to claim 5, wherein the light emitting component is adapted to provide a light beam, the light beam enters the optical body through the light incident end of the optical body, and the light beam is transmitted to an object and reflected after existing the optical body from the light output end, and is transmitted to the sensing unit through the lens portion, and the sensing unit is adapted to sense an identification code on the object through the light beam reflected by the object.

7. The optical image sensing module according to claim 1, wherein the lens portion of the optical body has a first optical surface and a second optical surface, the first optical surface and the second optical surface are opposite to each other, and the first optical surface faces the base, the light guiding portion has a light output surface, an outer peripheral surface, a light incident surface and a first inner peripheral surface, wherein the outer peripheral surface connects the light output surface and the light incident surface, the first inner peripheral surface connects the light incident surface of the light guiding portion and the first optical surface of the lens portion, and the first inner peripheral surface surrounds the light shielding portion of the base.

8. The optical image sensing module according to claim 7, wherein the light guiding portion further has a second inner peripheral surface, and the second inner peripheral surface connects the light output surface of the light guiding portion and the second optical surface of the lens portion.

9. The optical image sensing module according to claim 8, wherein the second inner peripheral surface, the light output surface and the second optical surface form a tapered recess structure together.

10. The optical image sensing module according to claim 7, wherein the second optical surface is a convex surface, and the second optical surface is protruded toward a direction away from the optical body.

11. The optical image sensing module according to claim 7, wherein the outer peripheral surface is a curved surface, and the outer peripheral surface protrudes toward outside of the optical body.

12. The optical image sensing module according to claim 7, wherein the light emitting component has a light emitting surface, and the light emitting surface faces the light incident surface of the light guiding portion.

13. The optical image sensing module according to claim 1, wherein the lens portion has an optical axis, and the light guiding portion is axially symmetric with respect to the optical axis of the lens portion.

14. The optical image sensing module according to claim 1, wherein the base is integrally formed.

15. The optical image sensing module according to claim 1, wherein the optical body is integrally formed.

16. The optical image sensing module according to claim 1, wherein the base has at least one positioning protrusion, and the optical body has at least one positioning groove, and the at least one positioning protrusion protrudes into the at least one positioning groove to fix a relative position of the base and the optical body.

17. The optical image sensing module according to claim 1, further comprising:
  a substrate, wherein the substrate comprises a circuit board, and the sensing unit and the light emitting component are disposed on a surface of the substrate and electrically connected to the circuit board.

18. An optical image sensing module, comprising:
  a substrate;
  an image sensing component, disposed on a surface of the substrate;
  an infrared light source, disposed on the surface of the substrate;
  a light shielding cylinder, having a first opening and a second opening opposite to each other and disposed on the surface of the substrate, and the image sensing component located in the second opening;
  a light guiding body, located at a side of the light shielding cylinder, having a light incident surface and a light output surface; and
  a lens, adjacent to the first opening of the light shielding cylinder;

wherein an infrared light generated by the infrared light source enters the light guiding body from the light incident surface, and then exits the light guiding body through the light output surface, and is reflected on a media surface, and then enters the light shielding cylinder through the lens to form an image on the image sensing component.

19. The optical image sensing module according to claim 18, further comprising a spacer disposed on the surface of the substrate and located between the image sensing component and the infrared light source.

20. The optical image sensing module according to claim 19, wherein the spacer is integrally formed with the light shielding cylinder.

21. The optical image sensing module according to claim 18, wherein the light guiding body is integrally formed with the lens.

22. The optical image sensing module according to claim 18, wherein the light guiding body is located at a side of the lens, and the lens forms a recessed portion with the light guiding body such that the light shielding cylinder is accommodated in the recessed portion.

23. The optical image sensing module according to claim 18, wherein the second opening is larger than the first opening.

* * * * *